United States Patent
Ruppert

(10) Patent No.: US 12,451,751 B2
(45) Date of Patent: Oct. 21, 2025

(54) STATOR AND METHOD FOR PRODUCING A STATOR

(71) Applicant: Schaeffler Technologies AG & Co. KG, Herzogenaurach (DE)

(72) Inventor: Andreas Ruppert, Buhlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 219 days.

(21) Appl. No.: 18/274,121

(22) PCT Filed: Dec. 9, 2021

(86) PCT No.: PCT/DE2021/100985
§ 371 (c)(1),
(2) Date: Jul. 25, 2023

(87) PCT Pub. No.: WO2022/161565
PCT Pub. Date: Aug. 4, 2022

(65) Prior Publication Data
US 2024/0429769 A1    Dec. 26, 2024

(30) Foreign Application Priority Data
Jan. 28, 2021    (DE) .................... 10 2021 101 914.1

(51) Int. Cl.
*H02K 3/52*    (2006.01)
*H02K 15/14*    (2006.01)

(52) U.S. Cl.
CPC ............. *H02K 3/521* (2013.01); *H02K 15/14* (2013.01); *H02K 2203/09* (2013.01)

(58) Field of Classification Search
CPC ........................... H02K 15/14; H02K 2203/09
(Continued)

(56) References Cited

U.S. PATENT DOCUMENTS

2007/0232094 A1* 10/2007 Hoshika ................. H02K 3/522
439/76.2
2020/0274405 A1* 8/2020 Csoti ....................... H02K 3/38

FOREIGN PATENT DOCUMENTS

CN           109792183 A     5/2019
DE       102008007409 A1     8/2009
(Continued)

OTHER PUBLICATIONS

DE-102009001830-A1, all paghes (Year: 2009).*
(Continued)

*Primary Examiner* — Naishadh N Desai
(74) *Attorney, Agent, or Firm* — Volpe Koenig

(57) ABSTRACT

A stator for an electric machine, having a winding including a plurality of interconnected conductors which are assigned to one or more phases, wherein: ends of at least some of the conductors project axially or radially beyond the winding. An interconnection ring having at least one support ring on which at least one bus bar is arranged is axially placed onto the winding, and the support ring is formed from a plastic and has concentrically extending annular grooves in each of which at least one bus bar is arranged. At least one end of a conductor is connected to a bus bar, at least one bus bar arranged in an annular groove is captively held in the annular groove by means of a bus bar securing element which overlaps at least portions of the annular groove in the radial direction, and the bus bar securing element as shaped by plastic deformation of a staking element which is formed integrally, in the axial direction from the support ring between two adjacent annular grooves, with the support ring.

19 Claims, 3 Drawing Sheets

(58) Field of Classification Search
USPC .......................................................... 310/71
See application file for complete search history.

(56) References Cited

FOREIGN PATENT DOCUMENTS

| DE | 102009001830 A1 | * | 10/2010 | ............ H02K 3/522 |
| DE | 102016200115 A1 | * | 7/2017 | ............ H02K 1/146 |
| DE | 112012004862 B4 | | 6/2022 | |
| JP | 2010119238 A | | 5/2010 | |
| WO | 2018062006 A1 | | 4/2018 | |

OTHER PUBLICATIONS

DE-102016200115-A1, allpages (Year: 2017).*
International Search Report and Written Opinion for International Application No. PCT/DE2021/100985 dated Mar. 1, 2022 (14 pages long).

* cited by examiner

STATOR AND METHOD FOR PRODUCING A STATOR

CROSS-REFERENCE TO RELATED APPLICATIONS

This application is the U.S. National Phase of PCT Appln. No. PCT/DE2021/100985, filed Dec. 9, 2021, which claims the benefit of German Patent Appln. No. 102021101914.1, filed Jan. 28, 2021, the entire disclosures of which are incorporated by reference herein.

TECHNICAL FIELD

The present disclosure relates to a stator for an electric machine, having a winding comprising a plurality of interconnected conductors which are assigned to one or more phases, wherein ends of at least some of the conductors project axially or radially beyond the winding and wherein an interconnection ring having at least one support ring on which at least one bus bar is arranged is axially placed onto the winding, and the support ring is formed from a plastic and has concentrically extending annular grooves in each of which at least one bus bar is arranged, wherein at least one end of a conductor is connected to a bus bar. The disclosure further relates to a method for producing a stator.

BACKGROUND

Permanently excited synchronous machines (PSM) are used in many industrial applications—and increasingly also in the automotive industry. Such a PSM consists of a stator to be energized and a permanently excited rotor.

In an electric machine of this type, the interconnection of the individual windings distributed around the circumference can, for example, be achieved by means of an interconnection ring or a plurality of interconnection rings. Here, bus bars usually made of copper can be arranged on or in a common support ring or separate support rings made of plastic. Occasionally, this type of interconnection ring has also been referred to as a switching ring or contact bridge. Such interconnection rings are usually placed axially on the winding package.

DE102008007409A1 describes, for example, a three-part switching ring for a stator, wherein three bus bars and a star point ring are arranged in a plane, lying flat next to one another in a support ring made of a temperature-resistant plastic. The contact points of the bus bars and the star point ring project from the support ring and are connected to the wire ends of the partial windings of the stator.

Securing the bus bars in or on the support ring often proves to be very difficult, as the installation space for this is limited. In the prior art, bus bars are often overmolded in the support ring with plastic or are placed in a shell-like receptacle of the support ring and then closed with a lid. This method of integration is often expensive and cannot be considered neutral when it comes to the use of installation space.

SUMMARY

The object of the disclosure is thus to integrate the bus bars in the support ring without using additional components and, at the same time, in a manner that does not require additional installation space.

This object is achieved by a stator for an electric machine, having a winding comprising a plurality of interconnected conductors which are assigned to one or more phases, wherein ends of at least some of the conductors project axially or radially beyond the winding and wherein an interconnection ring having at least one support ring on which at least one bus bar is arranged is axially placed onto the winding, and the support ring is formed from a plastic and has concentrically extending annular grooves in each of which at least one bus bar is arranged, wherein at least one end of a conductor is connected to a bus bar, wherein at least one bus bar arranged in an annular groove is captively held in the annular groove by means of a bus bar securing element which overlaps at least portions of the annular groove in the radial direction, wherein the bus bar securing element was shaped by plastic deformation of a staking element, which is formed integrally with the support ring, in the axial direction from the support ring between two adjacent annular grooves.

A stator can be provided in this manner that implements a safe and non-detachable securing of a bus bar in an annular groove without additional securing components being required. The plastic deformation is further possible by means of cost-effective and reliable forming processes.

First, the individual elements of the claimed subject matter of the disclosure are explained in the order in which they are named in the set of claims and particularly preferred embodiments of the subject matter of the disclosure are described below.

Electric machines are used to convert electrical energy into mechanical energy and/or vice versa, and generally comprise a stationary part referred to as a stator, stand, or armature, and a part referred to as a rotor or runner, and arranged movably relative to the stationary part.

In the case of electric machines designed as rotation machines, a distinction is made in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator. In connection with the present disclosure, it is preferred to provide the stator for a radial flux machine.

The motor housing encloses the electric machine. A motor housing can furthermore accommodate the control and power electronics. The motor housing can furthermore be part of a cooling system for the electric machine, and can be designed in such a way that cooling fluid can be supplied to the electric machine via the motor housing and/or the heat can be dissipated to the outside via the housing surfaces. In addition, the motor housing protects the electric machine and any electronics that might be present from external influences.

A motor housing can be formed in particular from a metallic material. Advantageously, the motor housing can be formed from a cast metal material, such as gray cast iron or cast steel. In principle, it is also conceivable to form the motor housing entirely or partially from a plastic.

In connection with the present disclosure, it is preferred that the stator be arranged within a motor housing.

The stator of a radial flux machine is usually constructed cylindrically and generally consists of electrical laminations that are electrically insulated from one another and are constructed in layers and packaged to form laminated cores. With this structure, the eddy currents in the stator caused by the stator field are kept low. Distributed over the circumference, grooves or circumferentially closed recesses are embedded into the electrical lamination running parallel to the rotor shaft, and accommodate the stator winding or parts of the stator winding. Depending on the construction towards the surface, the grooves can be closed with closing elements, such as closing wedges or covers or the like, to prevent the stator winding from detaching.

A support ring can accommodate one bus bar or a plurality of bus bars and, in particular, arrange them at a distance from one another in an electrically insulating manner.

A support ring generally has a basic circular ring shape with several circularly and concentrically arranged receptacles, such as grooves, in which the corresponding bus bars are arranged. Preferably, a support ring is made from a plastic material. In principle, it is conceivable to design a support ring in one piece or in several pieces.

In a likewise preferred embodiment of the disclosure, the annular grooves can also have a U-shaped contour in cross-section.

According to a further preferred embodiment of the subject matter of the disclosure, the stator can have a stator carrier in which at least portions of the stator are accommodated and by means of which the torque of the stator can be transmitted to a machine housing of the electric machine. The basic functions of the stator carrier in an electric machine are to carry the stator itself and to transmit the torque of the electric machine from the stator to the motor housing of the electric machine. The torque can be transmitted from the stator carrier to the motor housing, for example, by means of fastening lugs on the stator carrier, which can be designed as drawn sheet metal parts. It is also conceivable that the stator carrier can be axially preloaded by means of clamping claws, i.e. brackets. Torque can also be transmitted, for example, by means of a tongue-and-groove system and additional axial preloading via clamping claws.

It is preferred that the bus bar securing element 5 radially engages in two adjacent annular grooves 4 from an annular wall, and thus one bus bar securing element 5 captively holds two bus bars 29 in their respective annular grooves 4, thereby reducing manufacturing costs accordingly.

According to an advantageous embodiment of the disclosure, each of the bus bars arranged in an annular groove can be captively held in the respective annular groove by means of a bus bar securing element.

The object of the disclosure is further achieved by a method for producing a stator for an electric machine, having a winding comprising a plurality of interconnected conductors which are assigned to one or more phases, wherein ends of at least some of the conductors project axially or radially beyond the winding, comprising the following steps:

Providing an interconnection ring having at least one support ring, wherein the support ring is formed from a plastic and has concentrically extending annular grooves in each of which at least one bus bar can be arranged, and at least one staking element which is formed integrally with the support ring and projects in the axial direction from the support ring between two adjacent annular grooves, Inserting the at least one bus bar into one of the annular grooves, Forming a bus bar securing element by plastic deformation of the staking element, which is formed integrally with the support ring, in the axial direction from the support ring between two adjacent annular grooves, in the manner that the at least one bus bar arranged in an annular groove is captively held in the annular groove by means of a bus bar securing element which overlaps at least portions of the annular groove by plastic deformation in the radial direction.

Furthermore, according to an equally advantageous embodiment of the disclosure, the plastic deformation of the staking element can be effected by staking in the axial direction.

According to a further particularly preferred embodiment of the disclosure, the staking process can be performed as cold staking or hot staking. Hot staking is particularly preferred, since the plastic material can be melted by supplying heat and can thus be staked more accurately and with greater process stability.

Furthermore, it is also preferred that the staking forms the bus bar securing element in such a way that the latter contacts the bus bar inserted in the annular groove in the axial direction in such a way that the bus bar is secured in the groove in the radial direction in a force-fitting manner. This can further improve the securing and captive holding of the bus bar in the annular groove.

Furthermore, the disclosure can also be further developed in that the support ring has concentrically extending annular walls delimiting the annular groove, wherein a staking element projects from at least one annular wall in the axial direction from the support ring.

In a likewise preferred embodiment of the disclosure, the annular wall can have, in the region of the staking element, an annular wall section which is set back axially inwards relative to the annular wall. This allows staked material to flow into these annular wall sections, so that an annular wall can be implemented which is optimized in terms of installation space in the axial direction. In this regard, the staking element and the staking process are configured in such a way that after the staking element has been staked, it does not project axially beyond the annular wall.

It can also be advantageous to develop the disclosure further in that at least one support element is provided on the side of the support ring opposite the annular groove in the region of the staking element for absorbing the axial forces during the plastic deformation of the staking element, in order to avoid possible damage or unwanted plastic deformation of the support ring.

According to a further preferred embodiment of the subject matter of the disclosure, the plastic deformation can be effected with a punch which has a flat or contoured surface via which the staking element is subjected to force in the axial direction.

Finally, the disclosure can also be advantageously implemented in that the plastic deformation of the staking element by the punch is effected in a force- and/or displacement-controlled manner, which can further improve the process reliability of the staking process.

BRIEF DESCRIPTION OF THE DRAWINGS

The disclosure will be explained in more detail below with reference to figures without limiting the general concept of the disclosure.

In the figures.

DETAILED DESCRIPTION

Figure 1:
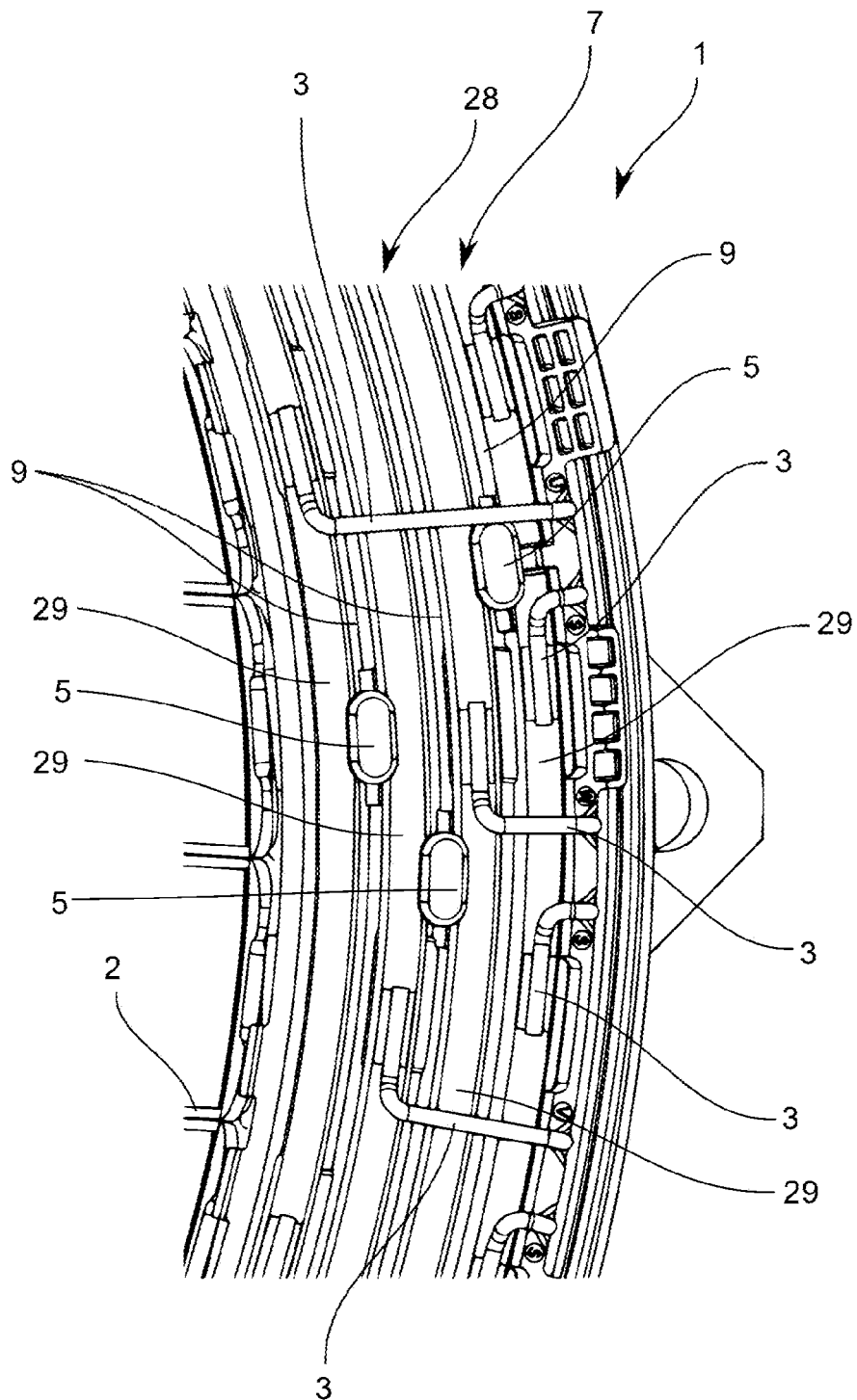
FIG. 1 shows a stator with a support ring in a perspective sectional view.

FIG. 1 shows a stator 1 for an electric machine, having a winding 2 comprising a plurality of interconnected conductors 3 which are assigned to one or more phases, wherein ends of at least some of the conductors 3 project axially or radially beyond the winding 2.

The stator 1 has an interconnection ring 28 with at least one support ring 7, on which at least one bus bar 29 is arranged. The support ring 7 is placed axially onto the winding 2. The support ring 7 made of plastic has concentrically extending annular grooves 4, in each of which at least one bus bar 29 is arranged. At least one end of a conductor 3 is connected to a bus bar 29, for example by means of welding or soldering.

A bus bar 29 arranged in an annular groove 4 is captively held there by means of a bus bar securing element 5 which overlaps at least portions of the annular groove 4 in the radial direction. The bus bar securing element 5 is shaped by plastic deformation of a staking element 6, which is formed integrally with the support ring 7, in the axial direction from the support ring 7 between two adjacent annular grooves 4, which will be discussed in more detail below.

In the embodiment shown in FIG. 1, each of the bus bars 29 arranged in an annular groove 4 is captively held in the respective annular groove 4 by means of a bus bar securing element 5. The bus bar securing elements 5 are arranged on the annular walls 9 offset from one another in the circumferential direction.

The electric machine shown in FIG. 1 is designed with a concentrated winding 2. This means that the winding 2 wraps around individual teeth of the stator 1 several times. There is one phase input and one phase output per tooth. The input is coupled to the bus bars 29 of the power electronics and the phase outputs are interconnected to form a so-called star point. This connection is also referred to as an interconnection.

In the embodiment shown in FIG. 1, the interconnection ring 28 consists of three bus bars 29 which are directly coupled to the phases of the power electronics. All phase inputs of the individual teeth of the stator 1 are interconnected in parallel with these three bus bars 29. In addition, the interconnection ring 28 has a fourth bus bar 29, which forms the so-called star point. This bus bar 29 can be divided according to the number of pole pairs. In the case of twelve pole pairs, this results in twelve decentralized star bars 29 or one common star bar 29. So-called decentralized star bars are often used to avoid circular currents.

Figure 2:
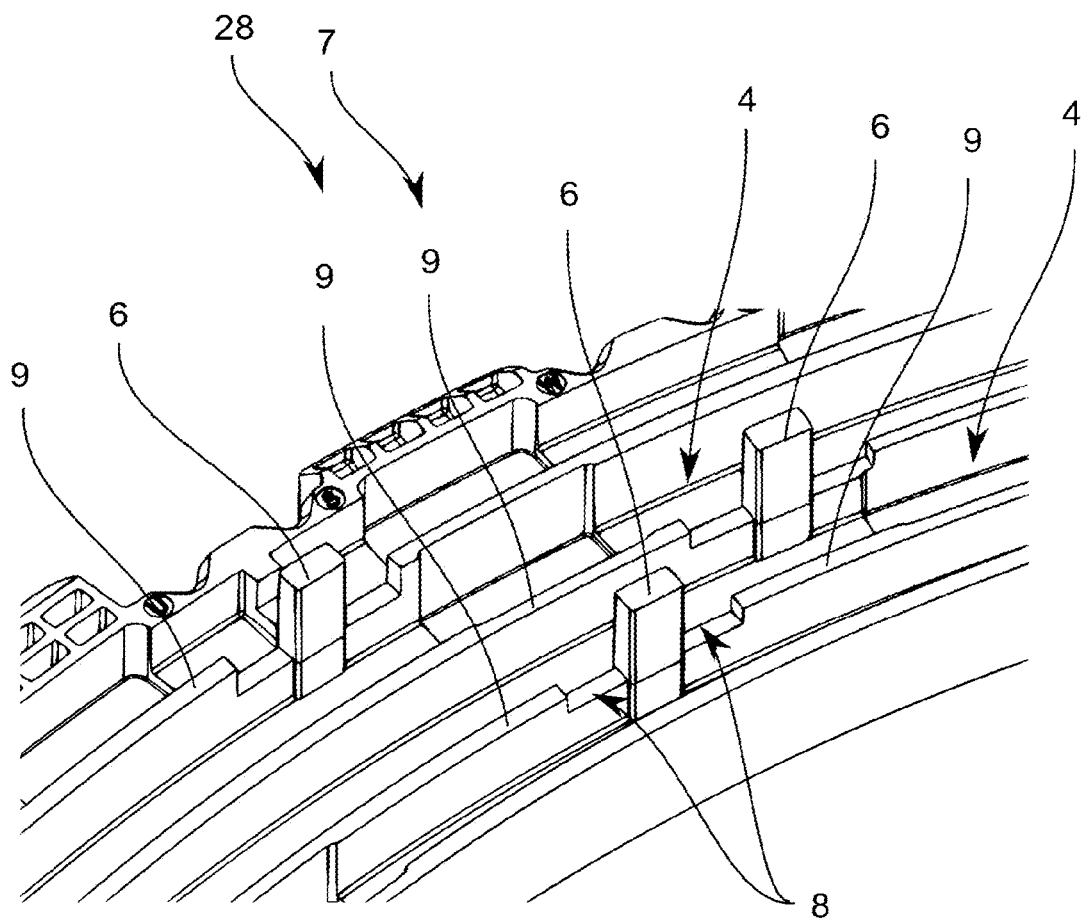
FIG. 2 shows a support ring of the stator with staking elements in a perspective sectional view.
Figure 3:
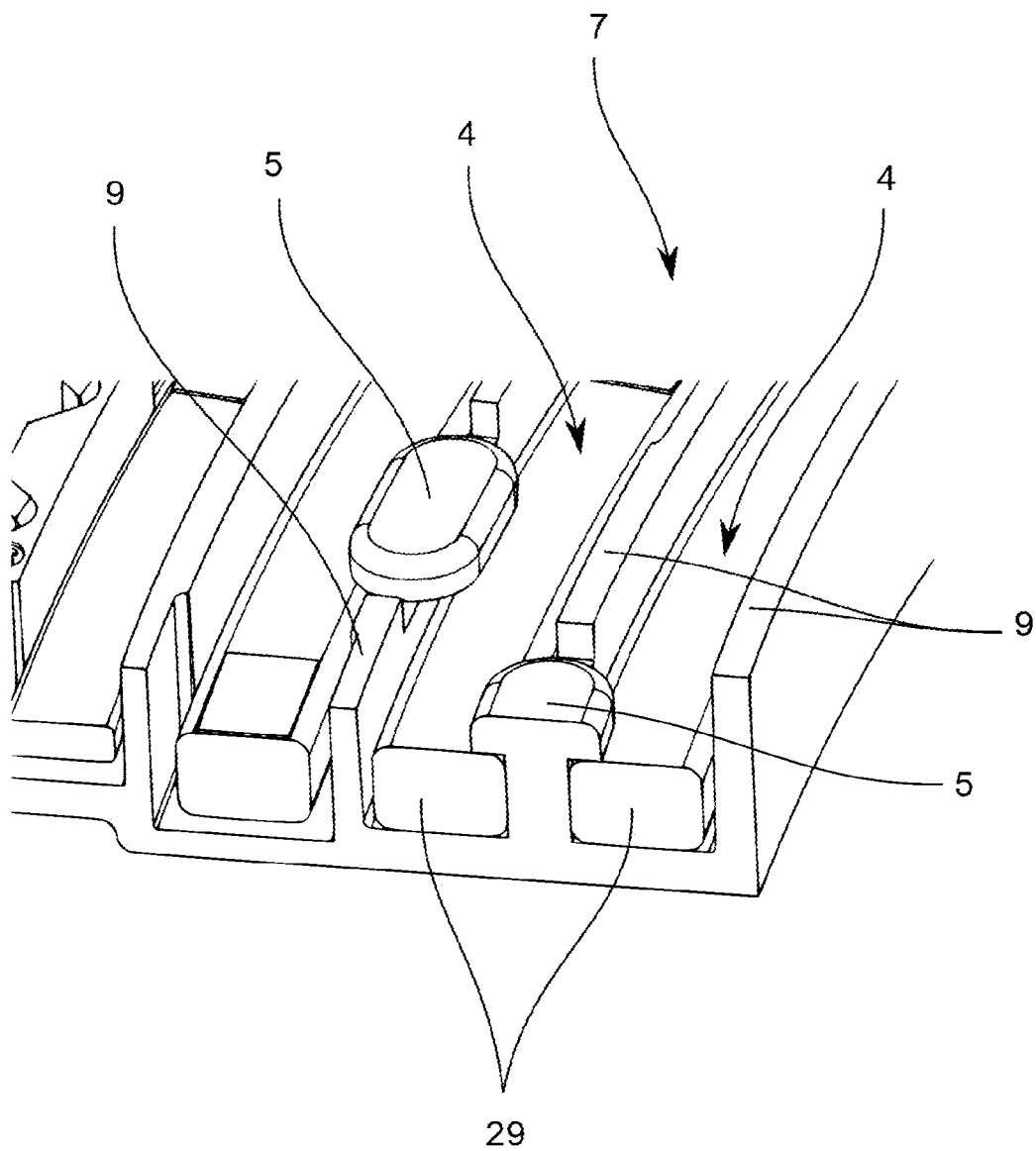
FIG. 3 shows a support ring of the stator with bus bars secured by bus bar securing elements in a perspective sectional view.

A method for producing a stator 1 for an electric machine, having a winding 2 comprising a plurality of interconnected conductors 3 which are assigned to one or more phases, wherein ends of at least some of the conductors 3 project axially or radially beyond the winding 2, as shown for example in FIGS. 1-3, can comprise the following steps:

Providing an interconnection ring 28 having at least one support ring 7, wherein the support ring 7 is formed from a plastic and has concentrically extending annular grooves 4 in each of which at least one bus bar 29 can be arranged, and at least one staking element 6 which is formed integrally with the support ring 7 and projects in the axial direction from the support ring 7 between two adjacent annular grooves 4, Inserting the at least one bus bar 29 into one of the annular grooves 4, Forming a bus bar securing element 5 by plastic deformation of the staking element 6, which is formed integrally with the support ring 7, in the axial direction from the support ring 7 between two adjacent annular grooves 4, in the manner that the at least one bus bar 29 arranged in an annular groove 4 is captively held in the annular groove 4 by means of a bus bar securing element 5 which overlaps at least portions of the annular groove 4 by plastic deformation in the radial direction.

In particular method step c) becomes clear from a synopsis of FIGS. 2-3. FIG. 2 shows the support ring 7 with the staking elements 6 not yet plastically deformed, while FIG. 3 shows the support ring 7 with the staking elements 6 plastically deformed to form the bus bar securing elements 5.

The plastic deformation of the staking element 6 is effected by staking in the axial direction.

FIG. 2 further shows that the support ring 7 has concentrically extending annular walls 9 delimiting the annular groove 4, wherein a staking element 6 projects from at least one annular wall 9 in the axial direction from the support ring 7.

The annular wall 9 has, in the region of the staking element 6, an annular wall section 8 which is set back axially inwards relative to the annular wall 9 and into which the plastic material flowing during plastic deformation can be pressed. FIG. 3 clearly shows that the set back annular wall sections 8 are filled with plastic material after plastic deformation and the bus bar securing element 5 thus does not project beyond the annular walls 9 of the annular grooves 4 in the axial direction, so that the support ring 7 has a particularly compact axial design.

In the embodiment shown, the bus bar securing element 5 has a mushroom-headed spatial shape. The bus bar 29 arranged in the annular groove 4 is thus captively held in the annular groove 4 by means of the bus bar securing element 5 which overlaps portions of the annular groove 4 in the radial direction. In this regard, the bus bar securing element 5 can contact the bus bar 29 in the axial direction, which also allows the bus bar 29 to be secured in the groove 4 in the radial direction in a force-fitting manner.

It can further be seen that the bus bar securing element 5 radially engages in two adjacent annular grooves 4 from an annular wall 9, and thus one bus bar securing element 5 captively holds two bus bars 29 in their respective annular grooves 4.

The plastic deformation of a staking element 6 can be effected with a punch, which has a flat or contoured surface via which the staking element 6 is subjected to force in the axial direction. This allows the spatial shape of the bus bar securing element 5 formed by the plastic deformation of the staking element 6 to be defined. The plastic deformation of the staking element 6 by the punch can be effected in a force- and/or displacement-controlled manner.

At least one support element can be provided on the side of the support ring 7 opposite the annular groove 4 in the region of the staking element 6 for absorbing the axial forces during the plastic deformation of the staking element 6, but this is not shown in FIGS. 1-3.

The disclosure is not limited to the embodiments shown in the figures. The above description is therefore not to be regarded as limiting, but rather as illustrative. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SYMBOLS

1 Stator
2 Winding

3 Conductor
4 Annular grooves
5 Bus bar securing element
6 Staking element
7 Support ring
8 Annular wall section
9 Annular wall
28 Interconnection ring
29 Bus bar

The invention claimed is:

1. A stator for an electric machine comprising: a winding including a plurality of interconnected conductors which are assigned to one or more phases, wherein an end of at least one of the conductors projects axially or radially beyond the winding and wherein an interconnection ring having at least one support ring on which a plurality of bus bars are arranged is axially placed onto the winding, and the support ring is formed from a plastic and has a plurality of concentrically extending annular grooves in each of which one of the plurality of bus bars is arranged, wherein at least one end of each conductor is connected to a respective one of the plurality of bus bars, wherein at least one of the plurality of bus bars is captively held in a respective annular groove by a bus bar securing element which overlaps at least portions of the annular groove in the radial direction, wherein the bus bar securing element is a deformed staking element formed integrally with the support ring, and extends in the axial direction from the support ring between two adjacent annular grooves.

2. The stator according to claim 1, wherein each of the bus bars is captively held in a respective annular groove by a bus bar securing element.

3. A method for producing a stator for an electric machine, having a winding comprising a plurality of interconnected conductors which are assigned to one or more phases, wherein an end of at least one of the conductors projects axially or radially beyond the winding, comprising the steps of:
providing an interconnection ring having at least one support ring, wherein the support ring is formed from a plastic and has concentrically extending annular grooves in each of which at least one bus bar can be arranged, and at least one staking element formed integrally with the support ring and projects in an axial direction from the support ring between two adjacent annular grooves, inserting the at least one bus bar into one of the annular grooves, forming a bus bar securing element by plastic deformation of the staking element in an axial direction from the support ring between two adjacent annular grooves such that the at least one bus bar arranged in the annular groove is captively held in the annular groove by the bus bar securing element which overlaps at least portions of the annular groove by plastic deformation in the radial direction.

4. The method according to claim 3, wherein the plastic deformation of the staking element is effected by staking in the axial direction.

5. The method according to claim 4, wherein the staking forms the bus bar securing element so that the bus bar securing element contacts the bus bar inserted in the annular groove in the axial direction so that the bus bar is secured in the groove in the radial direction in a force-fitting manner.

6. The method according to claim 3, wherein the support ring has concentrically extending annular walls delimiting the annular groove, wherein a staking element projects from at least one annular wall in the axial direction from the support ring.

7. The method according to claim 6, wherein the annular wall has, in a region of the staking element, an annular wall section which is set back axially inwards relative to the annular wall.

8. The method according to claim 3, wherein the plastic deformation is effected with a punch which has a flat or contoured surface via which the staking element is subjected to force in an axial direction.

9. The method according to claim 8, wherein the plastic deformation of the staking element by the punch is effected in a force and/or displacement-controlled manner.

10. The stator according to claim 1, wherein the bus bar securing element contacts the bus bar.

11. The stator according to claim 1, wherein the support ring has concentrically extending annular walls delimiting at least one of the annular grooves.

12. The stator according to claim 1, further comprising at least one support element on a side of the support ring opposite the annular grooves.

13. An interconnection ring for a stator of an associated electric machine comprising at least one support ring on which a plurality of bus bars are arranged, the support ring is formed from a plastic and has a plurality of concentrically extending annular grooves in each of which one of the plurality of bus bars is arranged, wherein at least one of the plurality of bus bars is captively held in a respective annular groove by a bus bar securing element which overlaps at least portions of the annular groove in the radial direction, wherein the bus bar securing element is a deformed staking element formed integrally with the support ring, and extends in the axial direction from the support ring between two adjacent annular grooves.

14. The interconnection ring of claim 13, wherein each of the bus bars is captively held in a respective annular groove by a bus bar securing element.

15. The interconnection ring according to claim 13, wherein the bus bar securing element contacts the bus bar.

16. The interconnection ring according to claim 13, wherein the support ring has concentrically extending annular walls delimiting at least one of the annular grooves.

17. The interconnection ring according to claim 13, further comprising at least one support element on a side of the support ring opposite the annular grooves.

18. The stator according to claim 1, wherein the support ring has concentrically extending annular walls delimiting the annular groove, wherein a staking element projects from at least one annular wall in the axial direction from the support ring, wherein the annular wall has, in a region of the staking element, an annular wall section which is set back axially inwards relative to the annular wall.

19. The interconnection ring of claim 13, wherein the support ring has concentrically extending annular walls delimiting the annular groove, wherein a staking element projects from at least one annular wall in the axial direction from the support ring, wherein the annular wall has, in a region of the staking element, an annular wall section which is set back axially inwards relative to the annular wall.

* * * * *